(12) United States Patent
VanBlon et al.

(10) Patent No.: US 9,778,829 B2
(45) Date of Patent: Oct. 3, 2017

(54) MAGNIFICATION BASED ON EYE INPUT

(71) Applicant: Lenovo (Singapore) Pte. Ltd., New Tech Park (SG)

(72) Inventors: Russell Speight VanBlon, Raleigh, NC (US); Neal Robert Caliendo, Jr., Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 424 days.

(21) Appl. No.: 14/546,962

(22) Filed: Nov. 18, 2014

(65) Prior Publication Data
US 2015/0074602 A1 Mar. 12, 2015

Related U.S. Application Data

(63) Continuation-in-part of application No. 14/322,119, filed on Jul. 2, 2014, which is a continuation of
(Continued)

(51) Int. Cl.
G06F 3/0484 (2013.01)
G06F 3/01 (2006.01)
G06F 3/0488 (2013.01)
H04M 1/725 (2006.01)

(52) U.S. Cl.
CPC .......... *G06F 3/04842* (2013.01); *G06F 3/013* (2013.01); *G06F 3/0488* (2013.01);
(Continued)

(58) Field of Classification Search
CPC .............................. G06F 3/013; G06F 3/04842
See application file for complete search history.

(56) References Cited

U.S. PATENT DOCUMENTS 2,510,344 A 6/1950 Law
2,567,654 A 9/1951 Siezen
(Continued)

FOREIGN PATENT DOCUMENTS

CN 1255663 A 6/2000
CN 102033710 A 4/2011
(Continued)

OTHER PUBLICATIONS

Russell Speight Vanblon, Neal Robert Caliendo Jr., "Automatic Magnification and Selection confirmation", related pending U.S. Appl. No. 14/322,119, non-final office action dated May 4, 2016.

(Continued)

*Primary Examiner* — Li Sun
(74) *Attorney, Agent, or Firm* — John L. Rogitz; John M. Rogitz

(57) ABSTRACT

In one aspect, a device includes at least one processor, a display accessible to the at least one processor, and a memory accessible to the at least one processor. The memory bears instructions executable by the processor to detect first eye input to a first location on a user interface (UI) presented on the display, identify at least two selector elements as at least being presented on the display proximate to the first location, and present a magnification interface on the UI. The magnification interface comprises a larger rendition of the at least two selector elements relative to presentation of the at least two selector elements on the UI prior to the detection of the first eye input.

20 Claims, 9 Drawing Sheets

Related U.S. Application Data application No. 13/400,015, filed on Feb. 17, 2012, now Pat. No. 8,812,983.

(52) U.S. Cl.
CPC .................. *G06F 3/04886* (2013.01); *G06F 2203/04805* (2013.01); *H04M 1/72583* (2013.01); *H04M 2250/22* (2013.01)

(56) References Cited

U.S. PATENT DOCUMENTS

| | | | |
|---|---|---|---|
| 3,418,426 A | | 12/1968 | Schlegel et al. |
| 3,628,854 A | | 12/1971 | Jampolsky |
| 4,082,433 A | | 4/1978 | Appeldorn et al. |
| 4,190,330 A | | 2/1980 | Berreman |
| 4,577,928 A | | 3/1986 | Brown |
| 5,490,245 A | * | 2/1996 | Wugofski ........... G06F 3/04817 715/837 |
| 5,579,037 A | | 11/1996 | Tahara et al. |
| 5,583,702 A | | 12/1996 | Cintra |
| 6,046,847 A | | 4/2000 | Takahashi |
| 6,169,538 B1 | | 1/2001 | Nowlan et al. |
| 2004/0160419 A1 | | 8/2004 | Padgitt |
| 2008/0096610 A1 | | 4/2008 | Shin et al. |
| 2009/0019394 A1 | * | 1/2009 | Sekimoto ........... H04N 5/44543 715/811 |
| 2009/0065578 A1 | | 3/2009 | Peterson et al. |
| 2009/0177981 A1 | | 7/2009 | Christie et al. |
| 2009/0183120 A1 | | 7/2009 | Ording et al. |
| 2009/0201261 A1 | | 8/2009 | Day |
| 2009/0204410 A1 | | 8/2009 | Mozer et al. |
| 2009/0259349 A1 | | 10/2009 | Golenski |
| 2009/0315740 A1 | | 12/2009 | Hildreth et al. |
| 2010/0079508 A1 | | 4/2010 | Hodge et al. |
| 2010/0171720 A1 | | 7/2010 | Craig et al. |
| 2010/0211918 A1 | | 8/2010 | Liang et al. |
| 2010/0287493 A1 | | 11/2010 | Majumder |
| 2011/0065451 A1 | | 3/2011 | Danado et al. |
| 2011/0197156 A1 | * | 8/2011 | Strait ................... G06F 3/0481 715/771 |
| 2011/0252375 A1 | | 10/2011 | Chaudhri |
| 2012/0056876 A1 | * | 3/2012 | Lee ................... H04N 13/0434 345/419 |
| 2012/0149309 A1 | | 6/2012 | Hubner et al. |
| 2012/0220311 A1 | | 8/2012 | Rodriguez et al. |
| 2012/0268268 A1 | | 10/2012 | Bargero |
| 2012/0311437 A1 | * | 12/2012 | Weeldreyer .......... G06F 3/0488 715/252 |
| 2013/0021459 A1 | | 1/2013 | Vasilieff et al. |
| 2013/0044042 A1 | | 2/2013 | Olsson et al. |
| 2013/0170755 A1 | | 7/2013 | Dalton et al. |
| 2013/0241925 A1 | * | 9/2013 | Konami ................. G06T 15/08 345/419 |
| 2013/0246663 A1 | | 9/2013 | Raveendran et al. |
| 2013/0307771 A1 | | 11/2013 | Parker et al. |
| 2014/0201805 A1 | * | 7/2014 | Riordan ................ G06F 21/60 726/1 |
| 2014/0317524 A1 | | 10/2014 | Vanblon et al. |

FOREIGN PATENT DOCUMENTS

| | | |
|---|---|---|
| DE | 10310794 | 9/2004 |
| DE | 10310794 | 9/2007 |
| DE | 69937592 | 10/2008 |
| EP | 0880090 | 11/1998 |
| WO | 2004051392 | 6/2004 |

OTHER PUBLICATIONS

Russell Speight Vanblon, Neal Robert Caliendo, "Automatic Magnification and Selection Confirmation", related U.S. Appl. No. 14/322,119, Applicant's response to Non-Final office action filed Aug. 3, 2016.

Russell Speight Vanblon, Neal Robert Caliendo, Jr., "Automatic Magnification and Selection Confirmation" file history of related U.S. Appl. No. 14/322,119.

Russell Speight Vanblon, Neal Robert Caliendo Jr.; " Automatic Magnification and Selection Confirmation" file history of related U.S. Appl. No. 14/322,119, filed Jul. 2, 2014.

Russell Speight Vanblon, Suzanne Marion Beaumont, Rod David Waltermann, "Detecting Pause in Audible Input to Device" file history of related U.S. Appl. No. 14/095,369, filed Dec. 3, 2013.

Suzanne Marion Beaumont, Russell Speight Vanblon, Rod D. Waltermann, "Devices and Methods to Receive Input at a First Device and Present Output in Response on a Second Device Different from the First Device" file history of related U.S. Appl. No. 14/095,093. filed Dec. 3, 2013.

Jonathan Gaither Knox, Rod D. Waltermann, Liang Chen, Mark Evan Cohen, "Initiating Personal Assistant Application Based on Eye Tracking and Gestures" file history of related U.S. Appl. No. 14/095,235, filed Dec. 3, 2013.

Nathan J. Peterson, John Carl Mese, Russell Speight Vanblon, Arnold S. Weksler, Rod D. Waltermann, Xin Feng, Howard J. Locker, "Systems and Methods to Present Information on Device Based on Eye Tracking" file history of related U.S. Appl. No. 14/132,663, filed Dec. 18, 2013.

Russell Speight Vanblon, Rod David Waltermann, John Carl Mese, Arnold S. Weksler, Nathan J. Peterson, "Detecting Noise or Object Interruption in Audio Video Viewing and Altering Presentation Based Thereon" file history of related U.S. Appl. No. 14/158,990, filed Jan. 20, 2014.

Russell Speight Vanblon, Axel Ramirez Flores, Jennifer Greenwood Zawacki, Alan Ladd Painter, "Skin Mounted Input Device" file history of related U.S. Appl. No. 14/1162,115, filed Jan. 23, 2014.

Axel Ramirez Flores, Rod David Waltermann, James Anthony Hunt, Bruce Douglas Gress, James Alan Lacroix, "Glasses with Fluid-Fillable Membrane for Adjusting Focal Length of One or More Lenses of the Glasses" file history of related U.S. Appl. No. 14/453,024, filed Aug. 6, 2014.

Steven Richard Perrin, Jianbang Zhang, John Weldon, Scott Edwards Kelso, "Initiating Application and Performing Function Based on Input" file history of related U.S. Appl. No. 14/557,628, filed Dec. 2, 2014.

Rod David Waltermann, John Carl Mese, Nathan J. Peterson, Arnold S. Weksler, Russell Speight Vanblon, "Movement of Displayed Element from One Display to Another" file history of related U.S. Appl. No. 14/550,107, filed Nov. 21, 2014.

Amy Leigh Rose, Nathan J. Peterson, John Scott Crowe, Bryan Loyd Young, Jennifer Lee-Baron, "Presentation of Data on an at Least Partially Transparent Display Based on User Focus" file history of related U.S. Appl. No. 14/548,938, filed Nov. 20, 2014.

Wikipedia, "Electromyography", definition; http://en.wikipedia.org/wiki/Electromyogrpahy, printed from website Jan. 27, 2015.

ISOURCE: "Raise to Speak Makes Siri Wonderfully Useful (Once You Know How to Use It)", http:///isource.com/10/01/raise-to-speak-makes-siri-wonderfully-useful-once-you-know-how-to-use-it./ Web printout Nov. 15, 2013.

Tactus Technology, "Taking Touch Screen Interfaces Into a New Dimension", 2012 (13 pages).

Arthur Davis, Frank Kuhnlenz, "Optical Design Using Fresnel Lenses, Basic Principles and some Practical Examples" Optik & Photonik, Dec. 2007.

Superfocus, "See the World in Superfocus Revolutionary Eyeglasses Give You the Power to Focus Your Entire View at Any Distance", http://superfocus.com/eye-care-practitioners, printed from website Jun. 24, 2014.

Darren Quick, "PixelOptics to Launch 'world's first electronic focusing eyewear'", http://www.gizmag.com/pixeloptics-empower-electroni-focusing-glasses/17569/. Jan. 12, 2011.

Insight News, "Electronic-lens company PixelOptics is bankrupt", htttp://www.insightnews.com.au/_blog/NEWS_NOW!/post/lens/electronic-lens-company-pixeloptics-is-bankrupt/. Dec. 12, 2013.

Wikipedia, "Extended Display Identification Data", Definition; http://en.wikipedia.org/wiki/Extended_display_Identification_data, printed from website Oct. 10, 2014.

(56) References Cited

OTHER PUBLICATIONS

Extron , "Digital Connection, Understanding EDID—Extended Display Identification Data", Fall 2009, www.extron.com.
"Relationship Between Inches, Picas, Points, Pitch, and Twips", Article ID: 76388; http://support2.microsoft.com/KB/76388. Printed Oct. 10, 2014.
Wikipedia, "Polarizer" Definition; http://en.wikipedia.org/wiki/Polarizer, printed from website Jan. 14, 2015.
Wikepedia, "Smart Glass" Definition, http://en.wikipedia.org/wiki/Smart_glass, printed from website Jan. 14, 2015.
Wikipedia, "Microphone array", definition, http://en.wikipedia.org/wiki/Microphone_array, printed from website Jan. 22, 2015.
Wikipedia, "Beamforning", definition; http://en.wikipedia.org/wiki/Beamforming, printed from website Jan. 22, 2015.
"Understanding & Using Directional Microphones", http://www.soundonsound.com/sos/sep00/articles/direction.htm; Published in SOS Sep. 2000.
Wikipedia, "Microphone", definition; http://en.wilipedia.org/wkik/microphone, printed from website Jan. 22, 2015.
Thalmiclabs, "Myo-Tech Specs", http://www.thalmic.comien/myo/techspecs, printed from website Jan. 27, 2015.
Thalmiclabs, "Myo Gesture Control Armband" http://www.thalmic.com/en/myo, printed from website Jan. 27, 2015.
Russell Speight Vanblon, Neal Robert Caliendo, "Automatic Magnification and Selection Confirmation",related U.S. Appl. No. 14/322,119, Final Office Action dated Oct. 3, 2016.

\* cited by examiner

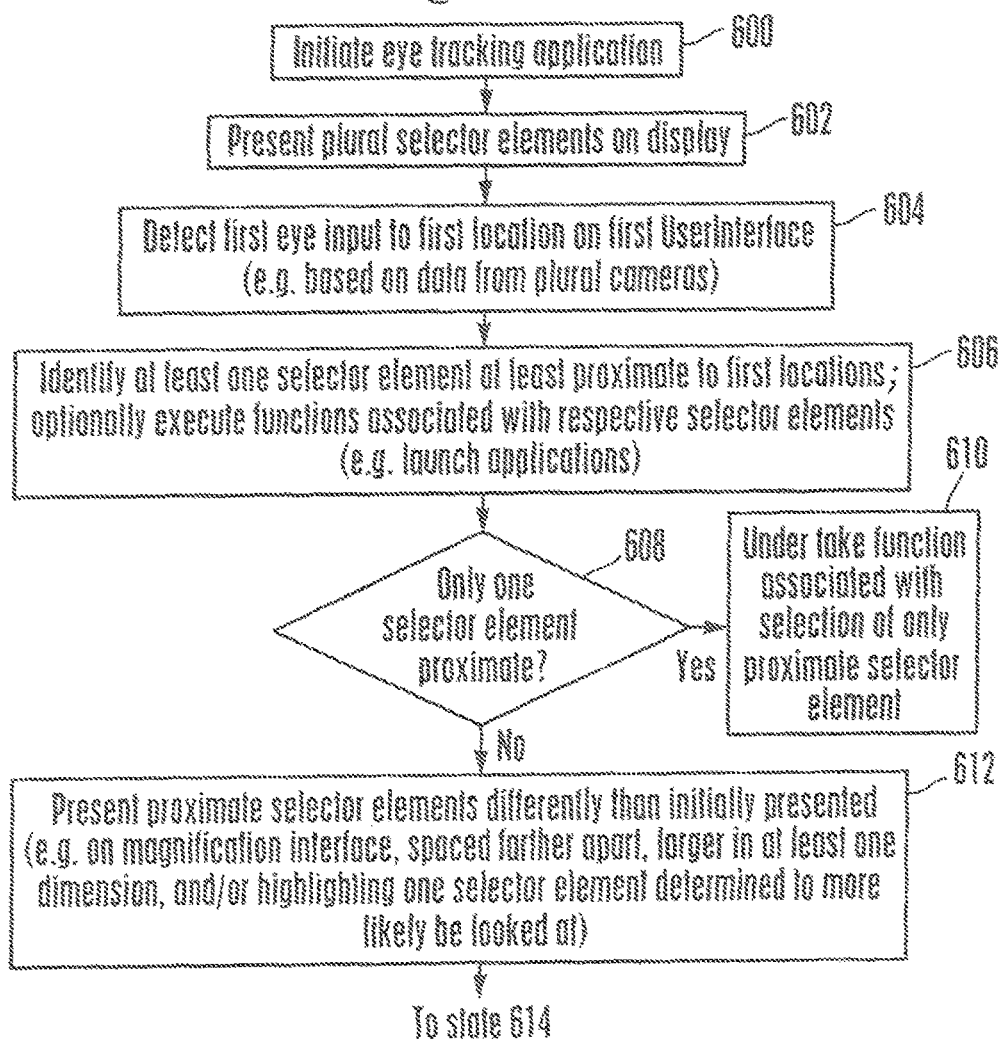

MAGNIFICATION BASED ON EYE INPUT

This application incorporates by reference in its entirety U.S. patent application Ser. No. 13/400,015 (now U.S. Pat. No. 8,812,983), filed Feb. 17, 2012, and incorporates by reference in its entirety U.S. patent application Ser. No. 14/322,119, filed Jul. 2, 2014.

I. FIELD

The present application relates generally to user interfaces presented on displays.

II. BACKGROUND

Modern information handling systems, especially mobile information handling systems such as mobile telephones, tablet devices, and the like, often present abundant information on a relatively small display screen. Because of the small size of the display screen and a relatively large number of graphical controls that may be presented in a small area, unintended selections often occur.

SUMMARY

Accordingly, in one aspect a device includes at least one processor, a display accessible to the at least one processor, and a memory accessible to the at least one processor. The memory bears instructions executable by the processor to detect first eye input to a first location on a user interface (UI) presented on the display, identify at least two selector elements as at least being presented on the display proximate to the first location, and present a magnification interface on the UI. The magnification interface comprises a larger rendition of the at least two selector elements relative to presentation of the at least two selector elements on the UI prior to the detection of the first eye input.

In another aspect, a method includes presenting a first selector element and a second selector element on a display, detecting first eye input to a first location on the display at least proximate to the first and second selector elements, and based on the detecting of the first eye input, identifying at least one of the first and second selector elements as at least potentially being looked at. The method also includes, in response to the identifying of the at least one of the first and second selector elements as at least potentially being looked at, presenting the first and second selector elements different than they were presented prior to receipt of the first eye input.

In still another aspect, an apparatus includes a first processor, a network adapter, and storage bearing instructions. The instructions are executable by a second processor for, using data from at least one camera, detecting first eye input to a first location on a user interface (UI) presented on a display, identifying at least one element as at least being presented on the display proximate to the first location, and without further user input, zooming in on the at least one element. The first processor transfers the instructions over a network via the network adapter.

The details of present principles, both as to their structure and operation, can best be understood in reference to the accompanying drawings, in which like reference numerals refer to like parts, and in which:

DETAILED DESCRIPTION

Figure 1:
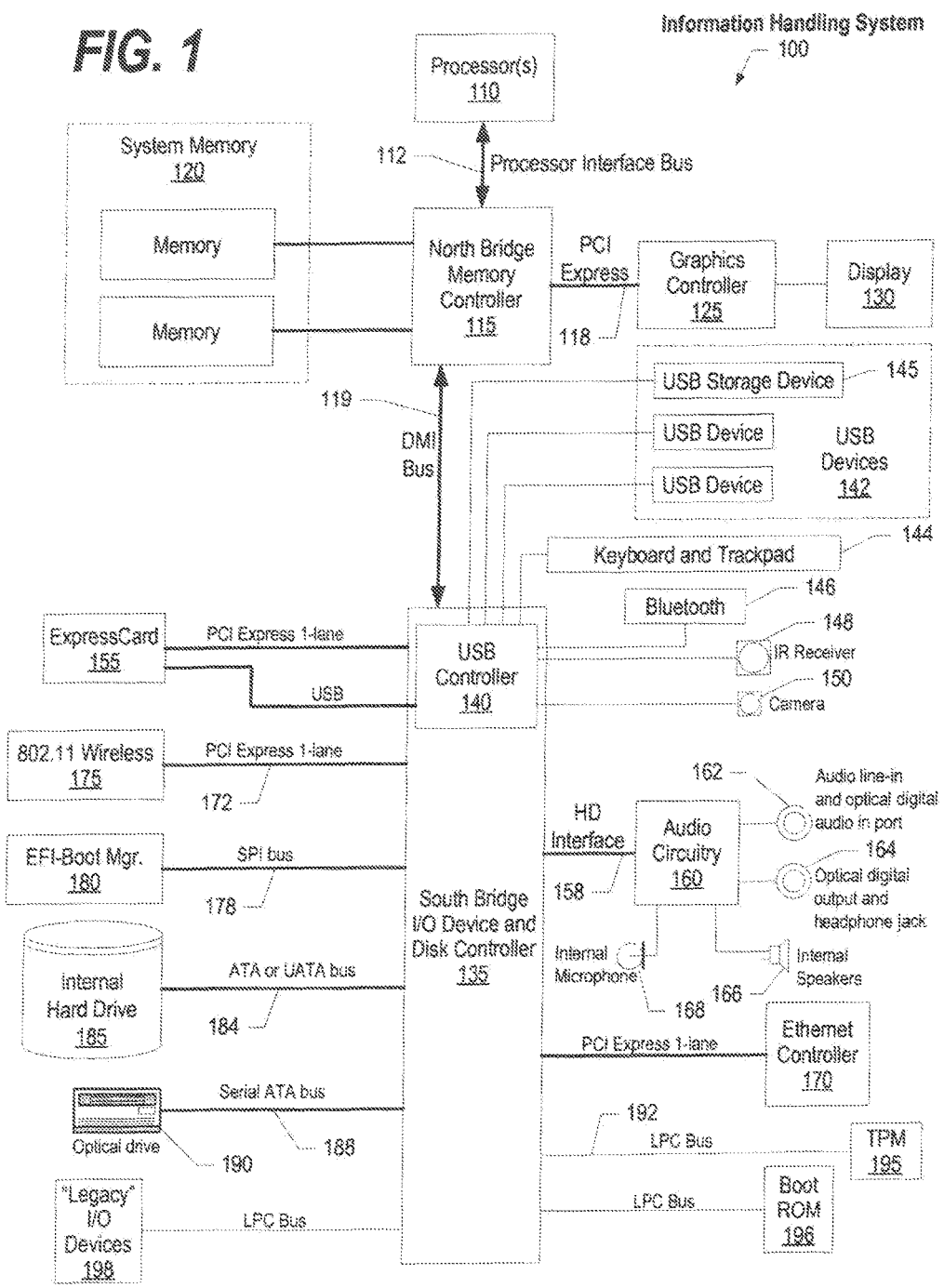
FIG. 1 is a block diagram of a data processing system in accordance with present principles.

This disclosure relates generally to device-based information. With respect to any computer systems discussed herein, a system may include server and client components, connected over a network, such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include at least one and optionally plural cameras 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device. ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
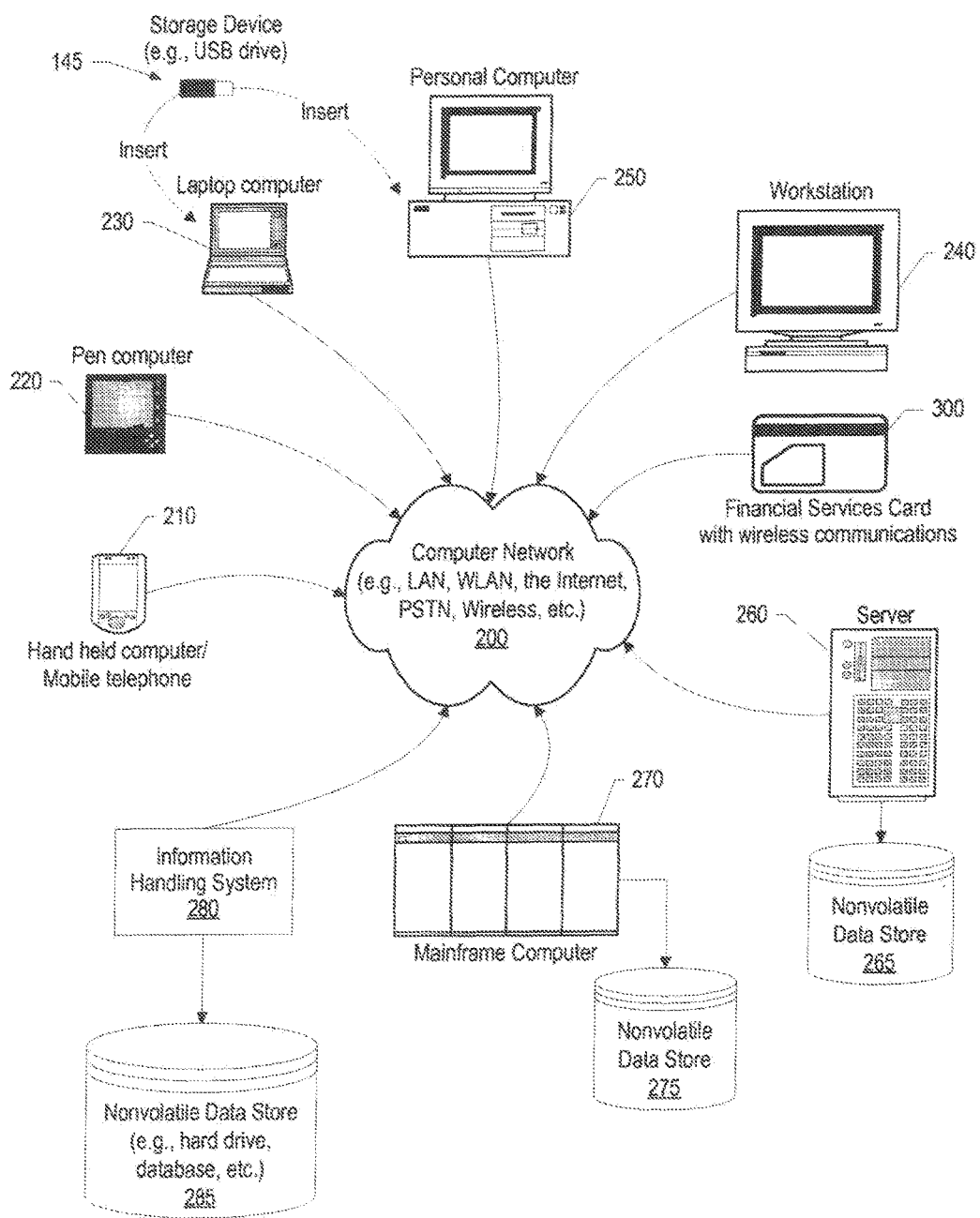
FIG. 2 is a block diagram of a network of devices in accordance with present principles.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
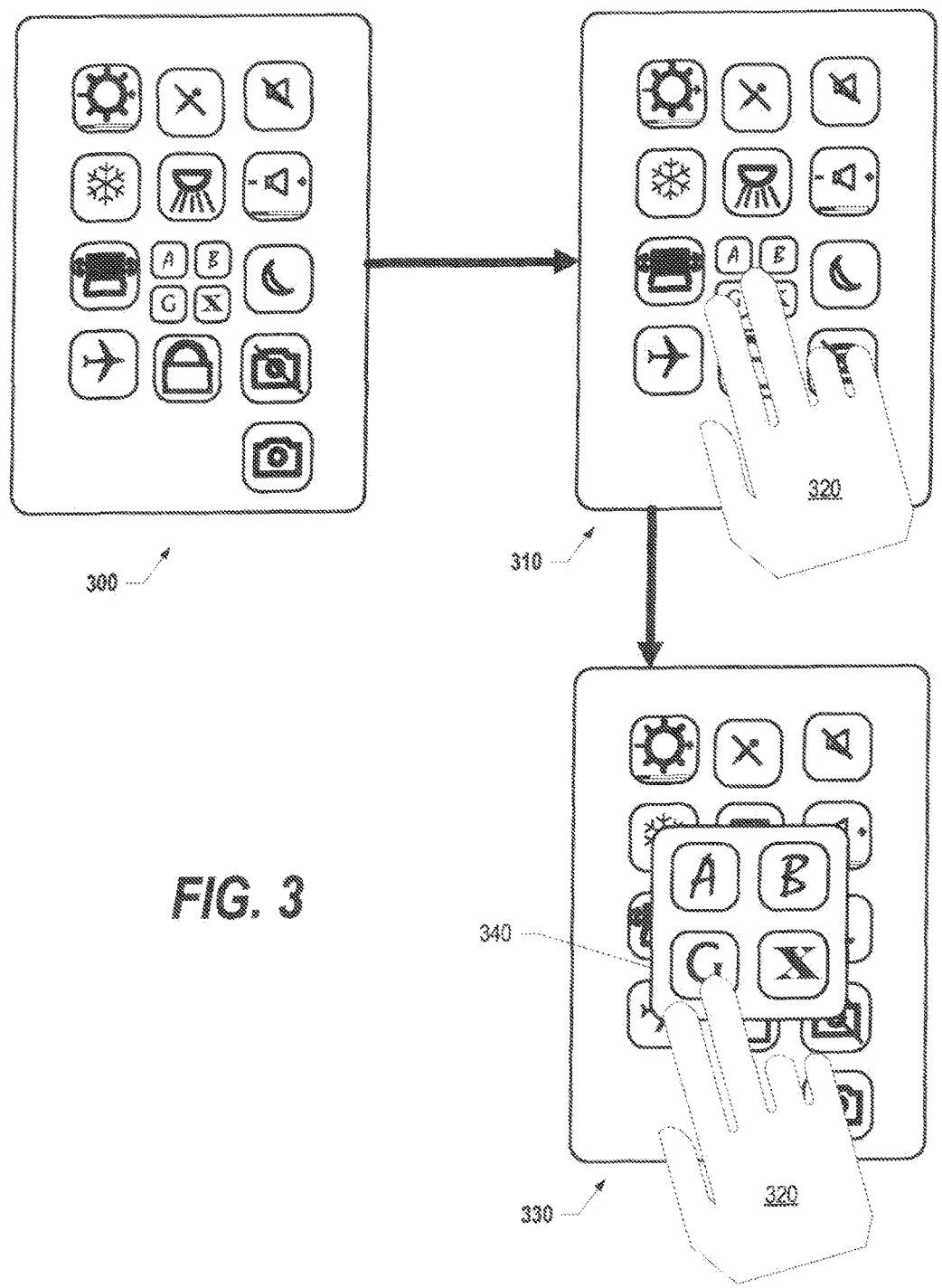
FIG. 3 is a series of screen diagrams showing automatic invocation of a magnification interface and a user's subsequent interaction.

FIG. 3 is a series of screen diagrams showing automatic invocation of a magnification interface and a user's subsequent interaction. Display screen 300, such as a mobile telephone display, a tablet display, or the like, may be a touch-enabled display that allows a user to select visual controls using a finger or may utilize other selection devices such as a stylus, mouse, etc. Some of these display screens may be relatively small, such as found in a portable information handling system such as a mobile telephone, etc. A small display screen may enable the device to be portable. However, because of the number of visual controls displayed on a small display screen, it may be difficult for the user to select a particular visual control, especially when the area of the display screen is crowded with relatively small visual controls. In the example shown in FIG. 3, display screen 300 has an area with a high concentration of small visual controls labeled "A", "B", "G", and "X". When the user attempts to select one of these small visual controls, there is a higher likelihood that an unintended selection will be made. For example, if the user is attempting to select the "G" visual control, there is a higher likelihood that the "A", "B", or "X" visual control will be mistakenly selected due to the close proximity of the controls. Display screen 310 depicts a user input, such as touching the display screen with a finger of the user's hand 320. In the example shown, the user is attempting to select one of the visual controls "A", "B", "G", or "X". Because of the small size and close spatial distances between the visual controls, the system responds by presenting magnification interface 340 shown in screen 330. Magnification interface 340 displays a larger rendition of the visual controls that were proximate to the user's input location where the user touched the screen in display screen 310. Now, with larger renditions of the visual controls presented, the user can more easily select the desired visual control (e.g., the "G" visual control, etc.) with much less likelihood of having an unintended selection. In one embodiment, the magnification interface (340) is displayed for a period of time (e.g., three second, etc.) so if the user does not utilize the magnification interface in the allowed time period the interface automatically closes. In one embodiment, the magnification interface automatically closes if the user touches an area outside of the magnification interface.

Figure 4:
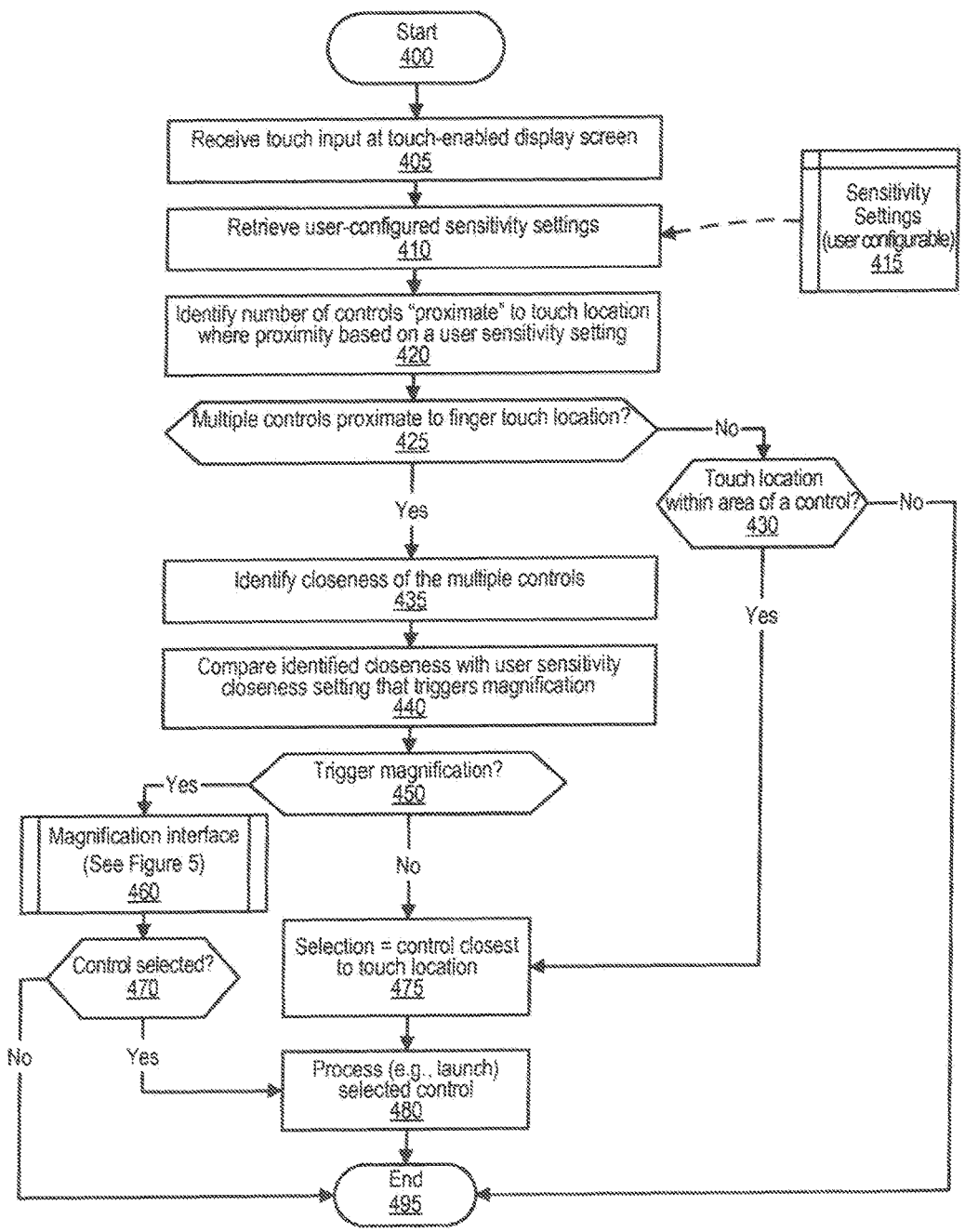
FIGS. 4-7 are flow charts showing example algorithms in accordance with present principles.

FIG. 4 is a flowchart showing steps performed in automatically detecting and triggering the magnification interface. Processing commences at 400 whereupon, at step 405, a user input is detected at a location on a display screen, such as a touch input being received at a touch-enabled display screen. In one embodiment, user-controllable sensitivity settings can be configured by the user to control the sensitivity of the magnification interface (e.g., control the screen characteristics under which the magnification interface is automatically displayed, etc.). In this embodiment, at step 410, the user-configured sensitivity settings are retrieved from sensitivity settings storage area 415 (e.g., a nonvolatile memory, etc.).

At step 420, the number of visual controls that are proximate to the detected user input location are identified, such as the visual controls that are close to the screen location where the user touched the touch-enabled display screen with his or her finger. In the embodiment using user-configured sensitivity settings, the number of controls identified is based on a user sensitivity setting (e.g., how many rows and columns worth of visual controls are considered proximate to the touch location, etc.). A decision is made as to whether there are multiple controls that are proximate to the user input location (decision 425).

If there are not multiple controls proximate to the user input location (e.g., the user selected one of the larger visual controls shown in display 300 in FIG. 3, etc.), then decision 425 branches to the "no" branch whereupon, a decision is made as to whether the user input location is within the area of a visual control (decision 430). If the user input location is within the area of a visual control, then decision 430 branches to the "yes" branch whereupon, at step 475 the selection is set to the visual control corresponding to the user's input location. At step 480, the visual control is processed (e.g., launched, executed, invoked, etc.). Processing then ends at 495. On the other hand, if the user input location is not within the area of a visual control (e.g., in a blank area of the screen, etc.), then decision 430 branches to the "no" branch whereupon processing ends at 495.

Returning to decision 425, if there are multiple controls proximate to the user's input location, then decision 425 branches to the "yes" branch for further processing. At step 435, the relative "closeness" based on spatial distance between the visual controls proximate to the user input location is identified. At step 440, the spatial distances between the visual controls is compared to a default setting or to a user-configured sensitivity setting if provided by the user. A decision is made, based on the comparison, as to whether the visual controls are too close together and, therefore, triggers the magnification interface (decision 450). If the magnification interface is triggered, then decision 450 branches to the "yes" branch for magnification interface processing. At predefined process 460, the magnification interface process is performed (see FIG. 5 and corresponding text for processing details). A decision is made as to whether the user selected a control while the magnification interface was displayed (decision 470). If the user selected a control within the magnification interface, then decision 470 branches to the "yes" branch whereupon, at step 480, the visual control is processed (e.g., launched, executed, invoked, etc.). On the other hand, if the user did not select a visual control while the magnification interface was displayed, then decision 470 branches to the "no" branch whereupon processing ends at 495.

Returning to decision 450, if the magnification interface is not triggered, then decision 450 branches to the "no" branch whereupon, at step 475 the selection is set to the visual control corresponding to the user's input location. At step 480, the visual control is processed (e.g., launched, executed, invoked, etc.). Processing then ends at 495.

Figure 5:
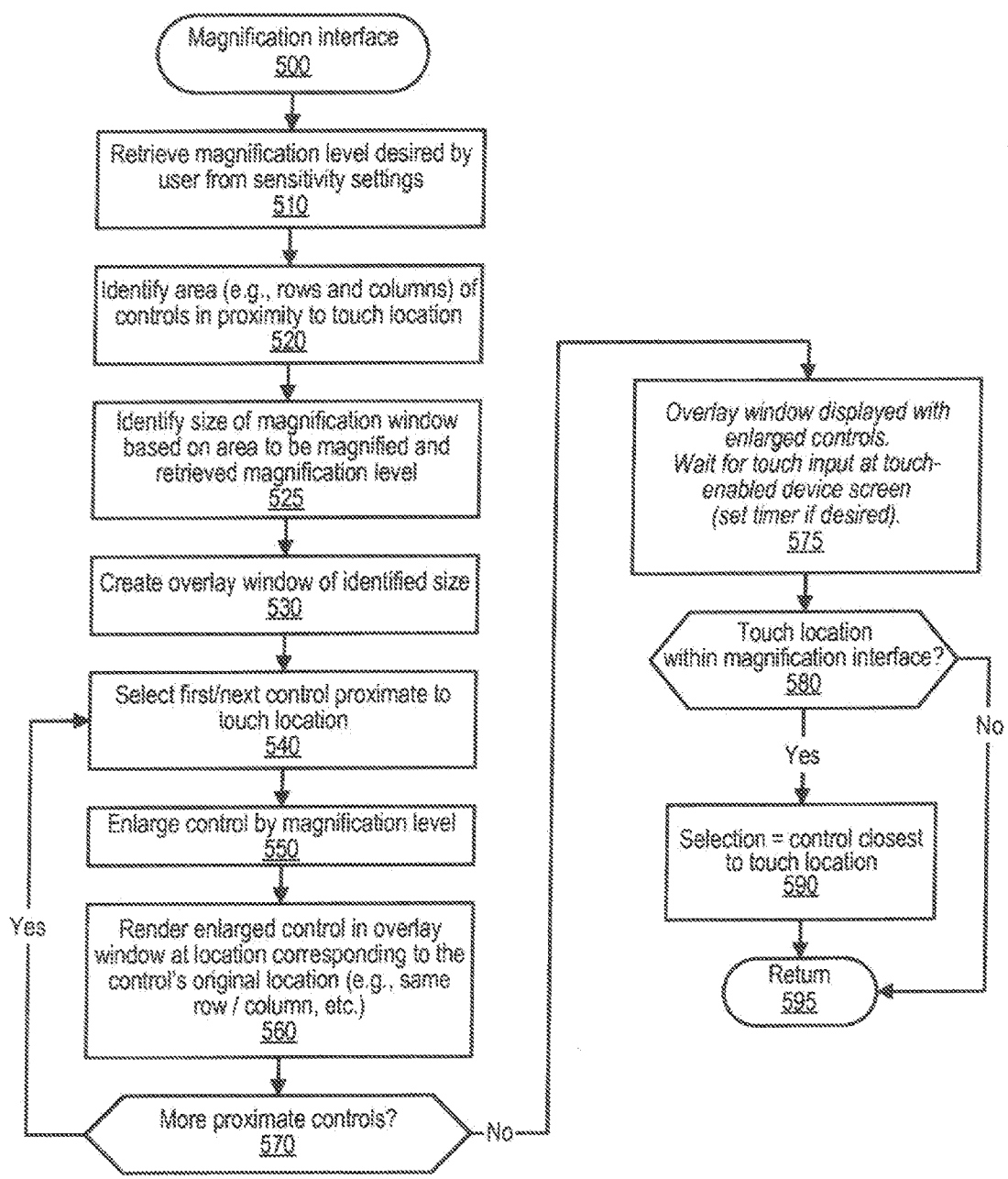

FIG. 5 is a flowchart showing the steps performed in operating the magnification interface. Processing commences at 500 whereupon, at step 510, the magnification level desired by the user is retrieved from the user configuration settings. At step 520, the area on the display screen, such as rows and columns of visual controls, is identified that are proximate to the user input location (e.g., the location where the user touched the display screen with a finger, pointer, etc.). At step 525, a size of the magnification interface (e.g., a window, etc.) is identified based on the area that is being magnified and the desired magnification level. At step 530, the magnification interface is created, such as using an overlay window, with the magnification interface being of the identified size.

At step 540, the first visual control proximate to the user input location is selected. At step 550, the selected visual control is enlarged to a larger rendition of the visual control based on the desired magnification level (e.g., three times larger, etc.). At step 560, the larger rendition of the selected visual control is rendered in the magnification interface at a location that corresponds to the visual control's original location with respect to the other visual controls that are being displayed in the magnification interface (e.g., in the same row, column, etc. respective to the other visual controls, etc.). At step 570, a decision is made as to whether there are more controls that are proximate to the user input location that are to be included in the magnification interface (decision 570). If there are additional controls to be included in the magnification interface, then decision 570 branches to the "yes" branch which loops back to select, magnify, and render the next visual control into the magnification interface. This looping continues until all of the visual controls proximate to the user input location have been selected, magnified, and rendered in the magnification interface, at which point decision 570 branches to the "no" branch for further processing.

At step 575, the magnification interface that includes a number of larger renditions of the visual controls is displayed to the user, such as magnification interface 340 shown in FIG. 3. Processing waits for a second user input from the user, such as the user touching one of the larger renditions of the controls displayed in the magnification interface. In one embodiment, a timer is set (e.g., for three seconds, etc.) so that the magnification interface is closed if the timer elapses without receiving a user selection.

A decision is made as to whether a second user input was received with the second input location being a location within the magnification interface (decision 580). If a second input was received with the second input being within the magnification interface, then decision 580 branches to the "yes" branch whereupon, at step 590, the user selection is the (larger) visual control closest to the user's second input location within the magnification interface. On the other hand, if a second input was not received within the magnification interface (e.g., the user touched an area outside of the magnification interface, the timer elapsed without the user making a selection, etc.), then decision 580 branches to the "no" branch bypassing step 590. Processing then returns to the calling routine (see FIG. 4) at 595.

Figure 6B:
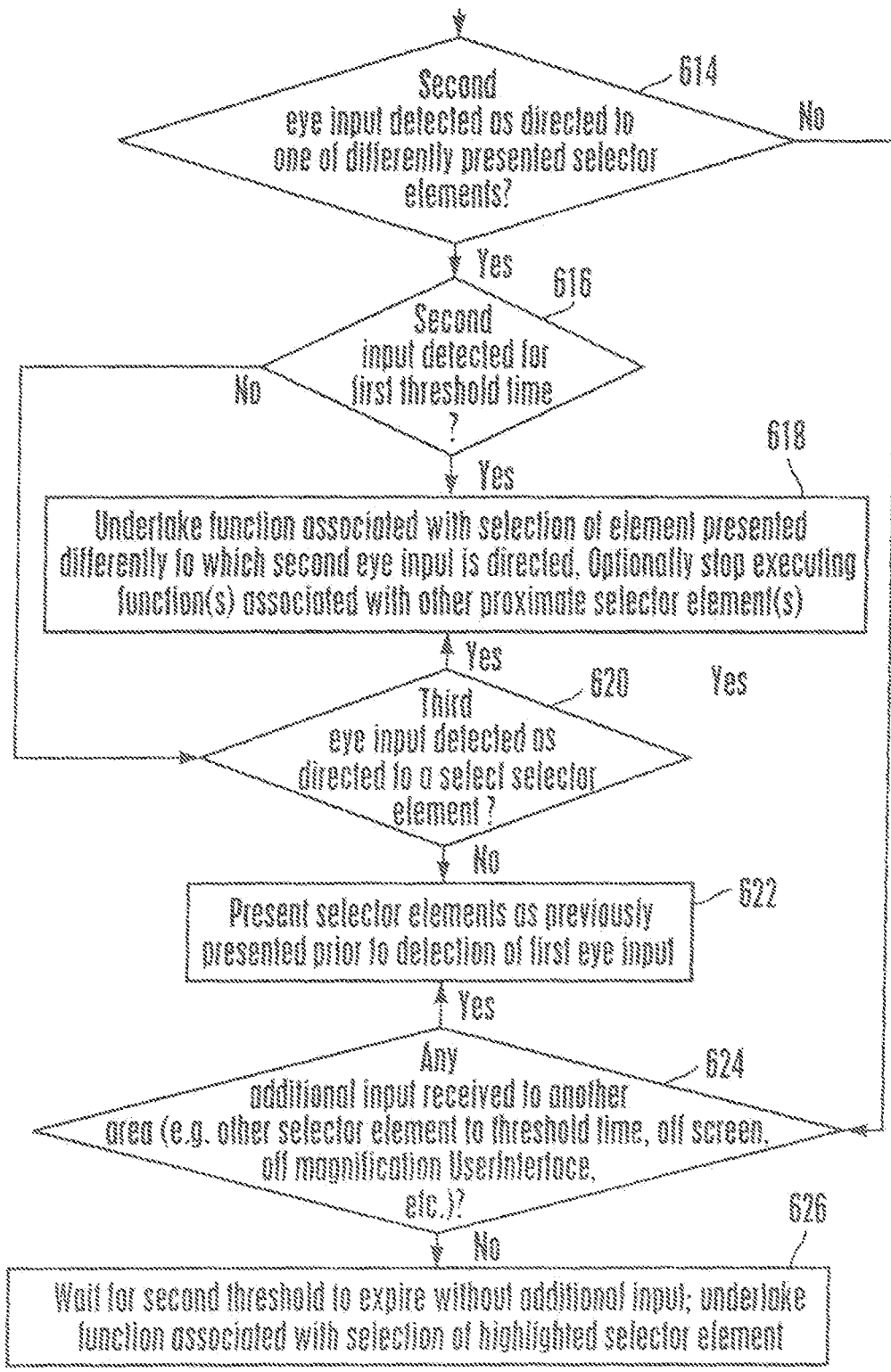

Continuing the detailed description in reference to FIGS. 6A and 6B, they show example logic that may be undertaken by a device such as the system 100 in accordance with present principles. Beginning at block 600, the logic initiates and/or executes eye tracking software and/or otherwise undertakes eye tracking principles, such as based on eye input to the system from a user that is detected based on data from at least one camera imaging the user's face. The logic then proceeds to block 602, at which the logic, if it has not done so already, presents plural selector elements (e.g. icons, hyperlinks, software buttons, etc.) on a first user interface (UI) presented on a display. The first UI may be, for example, a home screen UI typically presented at power on of the system. The first UI may also be e.g. an Internet browser UI or another UI associated with a particular application. In any case, after block 602 the logic proceeds to block 604. At block 604 the logic detects first eye input to a first location on the first UI e.g. based on data from plural cameras used to track the user's eye movements, focus depth (e.g. relative to the display on which the selector elements are presented), direction of focus (e.g. relative to the display on which the selector elements are presented), recognized commands input based on eye movement, etc.

Responsive to detection of the first eye input at block 604, the logic moves to block 606 at which the logic identifies at least one selector element at least proximate to the first location. Proximate may be determined based on one or more of e.g. predetermined and/or user-input distance thresholds (e.g. that the selector element should be at least partially within a particular number of millimeters as presented on the display relative to the first location on the display). Also at block 606, in some embodiments the logic may begin to execute functions associated with selection of the respective selector elements identified as being proximate to the first location, such as e.g. launching respective applications associated with the respective selector elements.

After block 606 the logic proceeds to decision diamond 608, where the logic determines whether only one selector element has been identified as being proximate to the first location. Responsive to an affirmative determination at diamond 608, the logic proceeds to block 610. At block 610 and without further user input the logic undertakes a function associated with selection of the only proximate selector element, such as e.g. initiating an associated application, accessing data, presenting a web page, actuating a camera and/or microphone, presenting information such as an email, etc.

However, a negative determination at diamond 608 instead causes the logic to proceed therefrom to block 612. At block 612, responsive to the negative determination at diamond 608, the logic presents the selector elements identified as being proximate to the first location differently than they were presented previously, such as e.g. at block 602. For example, the proximate selector elements may be presented on a magnification user interface in accordance with present principles that was not presented at the time of receipt of the first eye input, may be presented spaced farther apart on the display than they were presented at the time of receipt of the first eye input, may be presented larger in at least one dimension (e.g. height and/or width) than they were presented at the time of receipt of the first eye input (e.g. such as by zooming in animatedly on the proximate selector elements), and/or at least one of the proximate selector elements may be highlighted. Further, in some embodiments, the proximate selector elements may be presented differently by e.g. presenting them larger in at least one dimension while also highlighting only one of the proximate selector elements, where the highlighted proximate selector element is one of the proximate selector elements determined by the logic to be more likely to be the one looked at based on the first eye input.

Still in reference to FIGS. 6A and 6B, after block 612 as shown in FIG. 6A, the logic moves to decision diamond 614 as shown in FIG. 6B. At diamond 614 the logic determines whether second eye input has been detected as being directed to one of the differently presented proximate selector elements (e.g. for selection of one of the differently presented proximate selector elements). An affirmative determination causes the logic to proceed to decision diamond 616. At diamond 616 the logic determines whether the second eye input has been detected for a first threshold amount of time. For instance, the determination at diamond 616 may be that the user is looking constantly (e.g. staring) at one of the differently presented proximate selector elements for a threshold time without looking elsewhere. An affirmative determination at diamond 616 causes the logic to proceed to block 618, where the logic undertakes a function associated with selection of the differently presented proximate selector element being looked at for the threshold time. Also at block 618, the logic may stop executing or initiating a function associated with others of the differently presented proximate selector elements if such functions began to be executed at block 606. Thus, the function associated with the differently presented proximate selector element that was looked at for the threshold time may have begun to be executed at block 606 and accordingly at block 618 the user may be given relatively faster access to the function (e.g. presentation of information) than if it had not been initiated at block 606.

Referring back to decision diamond 616, if instead of an affirmative determination, a negative one is made thereat, the logic proceeds to decision diamond 620. At diamond 620 the logic determines whether third eye input has been directed to a select selector element presented on the display (e.g. and specifically in some embodiments, on a magnification user interface that is presented in particular). An affirmative determination at diamond 620 causes the logic to move to block 618 as described above. For instance the logic may determine that the second eye input was directed to one of the differently presented proximate selector elements and then determine that the third eye input was directed to the select selector element to thus select the differently presented proximate selector element to which the second eye input was directed to thus undertake a function associated with selection of the differently presented proximate selector element to which the second eye input was directed. In any case, note that if a negative determination is made at diamond 620, the logic instead moves to block 622, where the logic presents the differently presented proximate selector elements as they were previously presented e.g. prior to detection of the first eye input.

Referring back to decision diamond 614, note that should a negative rather than affirmative determination be made thereat, rather than the logic proceeding to diamond 616 it instead proceeds to decision diamond 624. At diamond 624 the logic determines whether any additional input other than the first eye input has been detected as directed to another area, such as e.g. eye input directed to another selector element presented on the display for a threshold time (e.g. a selector element other than the differently presented proximate selector elements), eye input directed to a location other than the display itself (e.g. looking offscreen), eye input directed to a location on the display not presenting the magnification user interface if one was presented at block 612, etc. An affirmative determination at diamond 624 causes the logic to proceed to block 622 as described above. However, a negative determination at diamond 624 instead causes the logic to move to block 626. At block 626 the logic waits for a second threshold time to expire during which no additional input is received, and responsive to the second threshold time expiring the logic may without further user input undertake a function associated with selection of a selector element determined by the logic to be more likely to be the one looked at based on the first eye input, such as e.g. a first selector element of the differently presented proximate selector elements that was highlighted at block 612.

Figure 7:
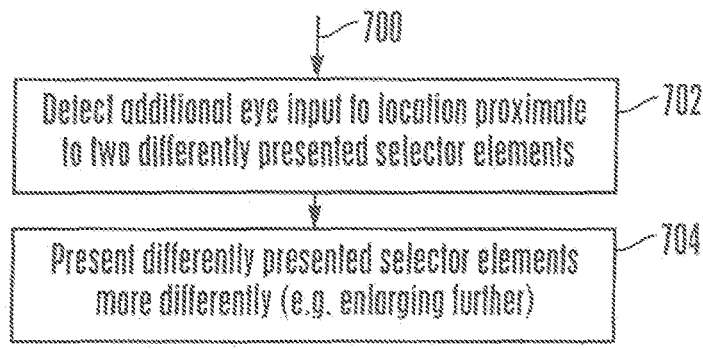

Before moving on to the description of FIG. 7, it is to be understood in reference to FIGS. 6A and 6B that the first and second threshold times described above may be e.g. established by a user based on manipulation of a UI for configuring settings for undertaking present principles. Also in reference to FIGS. 6A and 6B, it is to be understood that the second and third eye inputs (end even the first eye input) referenced above may, instead of being eye input, be still other forms of input such as e.g. touch input to the display if touch-enabled, input provided using a keyboard and/or mouse, etc.

Now in reference to FIG. 7, it also shows example logic that may be undertaken by a device such as the system 100 in accordance with present principles. Furthermore, it is to be understood that the logic of FIG. 7 may be undertaken in conjunction with the logic of FIGS. 6A and 6B. For instance, arrow 700 may be a procession in the logic from e.g. a negative determination at diamond 616 (instead of the logic proceeding to diamond 620 responsive to a negative determination at diamond 616). As another example, arrow 700 may be a procession in the logic from e.g. a negative determination at diamond 614 (instead of the logic proceeding to diamond 624 responsive to a negative determination at diamond 614). In any case, at block 702 the logic detects additional eye input to a location of the display proximate to locations at which at least two of the differently presented proximate selector elements are presented (e.g. on a magnification user interface). Responsive to detection of the additional eye input, the logic proceeds to block 704 where the logic presents more differently the at least two differently presented proximate selector elements, such as e.g. by enlarging them even further in at least one dimension than they were enlarged e.g. at block 612.

Figure 8:
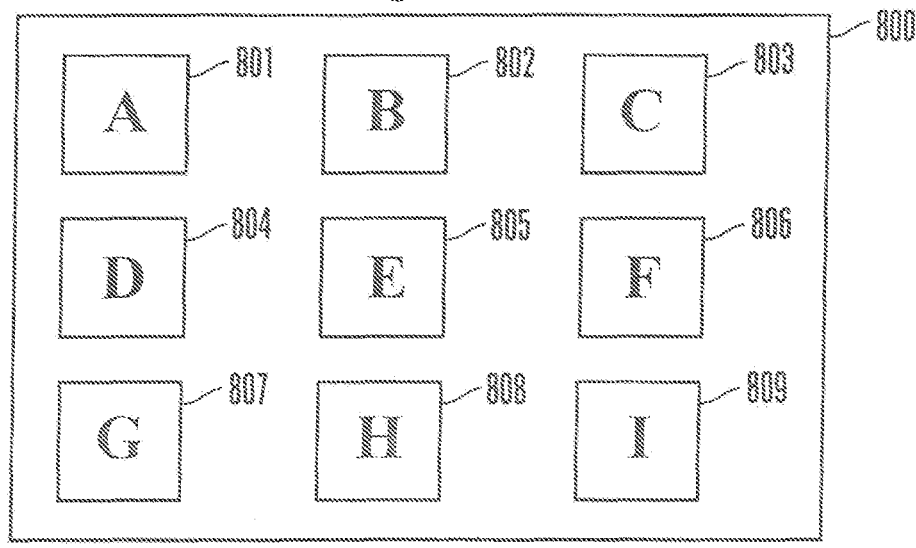
FIGS. 8-11 are example user interfaces (UI) in accordance with present principles.
Figure 9:
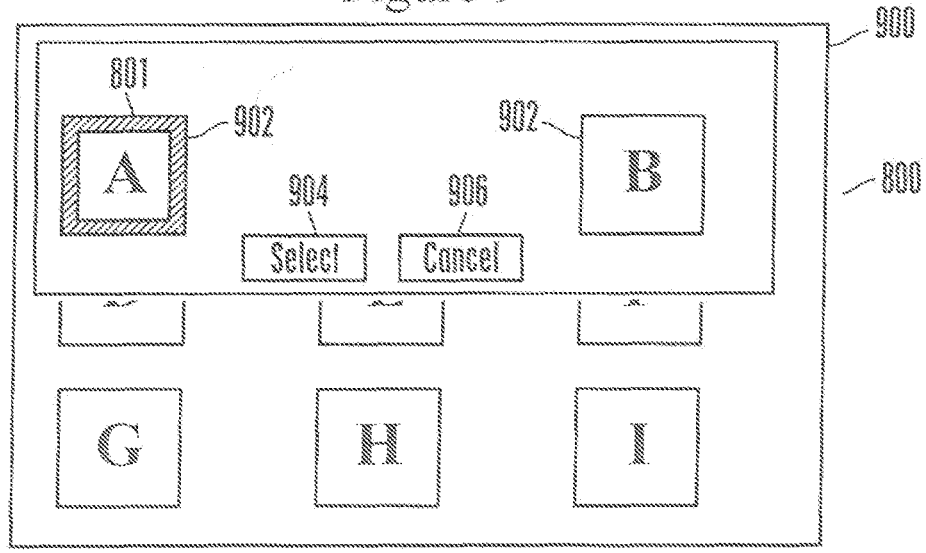

Continuing the detailed description in reference to FIG. 8, it shows an example user interface (UI) 800 including plural selector elements generally designated selector elements 801-809. The UI 800 may be e.g. the first UI described above that is presented at block 602 such as a home screen UI. As may be appreciated from FIG. 9, the UI 900 now has an example magnification UI 900 overlaid thereon, such as may have been done e.g. at block 612 described above. As may be appreciated from the UI 900, selector elements 801 and 802 are presented thereon. Furthermore, as may be appreciated from FIG. 9, each of the elements 801 and 802 as presented on the UI 900 are presented in at least one dimension (e.g. height and/or width) larger than the same respective dimension for the same respective element of the elements 801 and 802 as presented on the UI 800 as shown in FIG. 8. Furthermore, the elements 801 and 802 are spaced proportionally farther apart relative to each other than they were presented as shown in FIG. 8 despite being enlarged. What's more, note that selector element 801 has been highlighted as described above in reference to FIGS. 6A and 6B, as represented by the border 902 surrounding element 801. Though not shown owing to the black and white drawings, it is to be understood that the highlighted border 902 may be a color determined by a user, such as e.g. neon yellow or green, though in some embodiments it may simply be an additional and/or thicker border of the same color as another portion of the selector element Still in reference to the magnification UI 900 shown in FIG. 9, note that a select selector element 904 is shown which may be selectable e.g. using eye input as set forth above with respect to decision diamond 620 to, in the present example, select element 801 and thus undertake a function associated therewith. Notwithstanding, note that still other ways of selecting element 801 from the UI 900 may be used, such as e.g. a user staring at element 801 for a threshold time as described herein. Also note that the UI 900 may comprise a cancel selector element 906 which may be selectable e.g. using eye input (e.g. starting for a threshold time) to remove the UI 900 from presentation on a display on which it is presented and e.g. again present the UI 800 as shown in FIG. 8.

Figure 10:
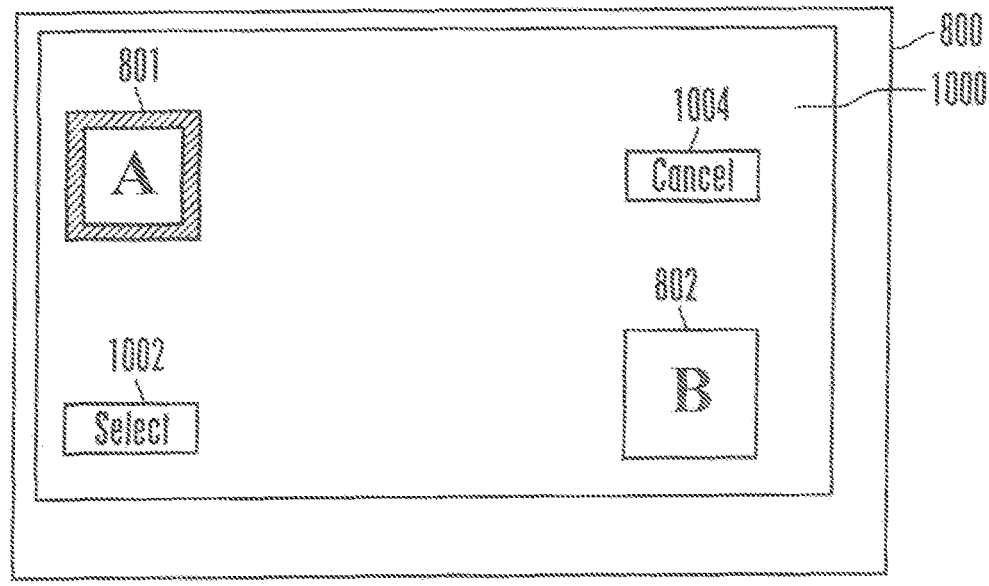

Now in reference to FIG. 10, it shows a second example magnification UI 1000 (e.g. that may be presented e.g. at block 704 as described above) overlaid on the UI 800, with the selector elements 801 and 802 presented on the UI 1000, relative to their presentation on the UI 900, in at least one dimension larger than the same respective dimension for the same respective selector element as presented on the UI 900, and also spaced proportionally farther apart relative to each other than they were presented on the UI 900 despite being further enlarged (e.g. along with the space therebetween). Further, note that the element 801 is highlighted based on the system which presents the UI 1000 determining element 801 to be more likely to be the one looked at based on eye input to the UI 900.

Still in reference to the magnification UI 1000 shown in FIG. 10, note that a select selector element 1002 is shown which may be selectable e.g. using eye input as set forth herein to, in the present example, select element 801 and thus undertake a function associated therewith (e.g. based on element 801 being determined to be the element most likely to be looked at and/or responsive to selection of the element 801 from the UI 1000) prior to selection of the element 1002). Also note that the UI 1000 may comprise a cancel selector element 1004 which may be selectable e.g. using eye input to remove the UI 1000 from presentation on a display on which it is presented and e.g. again present the UI 800 as shown in FIG. 8.

Figure 11:
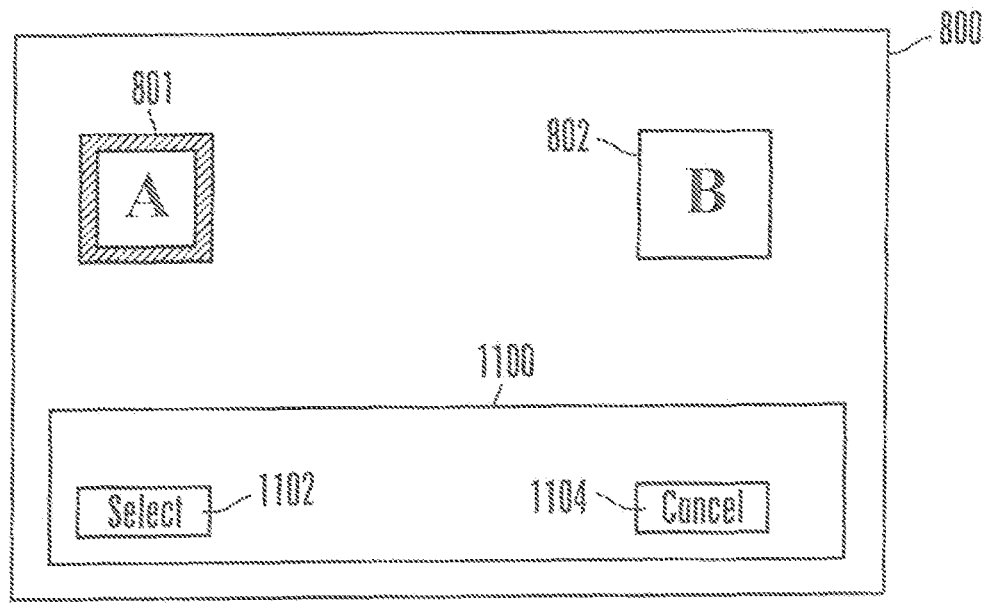

Reference is now made to FIG. 11, which shows another example of presenting proximate selector elements 801 and 802 differently than they were initially presented, such as may be done e.g. at block 612 of the example logic described above. FIG. 11 shows only a portion of the UI 800 of FIG. 8 zoomed in (e.g. after fast or slow animation of the zoom in from a point originating at or proximate to the location at which the user is identified as looking) on the elements 801 and 802 (with element 801 highlighted as set forth above), thus rendering the elements 801 and 802 presented in at least one dimension larger than the same respective dimension for the same selector element as presented as shown in FIG. 8. However, in contrast to FIG. 9, the elements 801 and 802, while presented respectively in at least one dimension larger, are not spaced proportionally farther apart relative to each other than they were presented as shown in FIG. 8.

Note that FIG. 11 also shows a UI 1100 overlaid on the portion of the UI 800 that has been zoomed in on. The UI 1100 includes a select selector element 1102 which may be selectable e.g. using eye input as set forth herein to, in the present example, select element 801 and thus undertake a function associated therewith (e.g. based on element 801 being determined to be the element most likely to be looked at and/or responsive to selection of the element 801 prior to selection of the element 1102), as well as a cancel selector element 1104 which may be selectable e.g. using eye input to remove the UI 1100 and/or zoom back out to again present the UI 800 as shown in FIG. 8.

Without reference to any particular figure, it is to be understood that in some embodiments, determining whether the user is looking at least substantially at a selector element may include e.g. determining whether the user is looking around and/or toward the element (e.g. within a threshold distance) based on at least one image from a camera in communication with the device and applying eye tracking software to the image, determining whether the user is looking directly at the selector element based on at least one image from the camera and applying eye tracking software to the image, and/or determining whether the user is looking within a threshold number of degrees of looking at the selector element relative to e.g. a vector established by the user's actual line of sight toward the display relative to the selector element presented on the display based on at least one image from the camera and applying eye tracking software to the image.

Also without reference to any particular figure, it is to be understood that the logic of the respective figures described above (e.g. FIGS. 4-7) may be undertaken in conjunction with each other, and that various steps described above need not be undertaken in the precise order described above.

It may now be appreciated that present principles provide for e.g. a device that detects relatively low-confidence selections, where a part of the screen is selected via a user's eyes. Present principles can be applied e.g. for screens with relatively high density areas of multiple controls such as icons or hypertext links. The device may display a larger view of the controls where the user can then view the selection that was interpreted by the device. If the user intended another selection, the user could use eye input and/or the device can use eye tracking (and/or touch input, stylus input, mouse input, etc.) to select the relatively larger version of the desired control. In addition to or in lieu of the foregoing, the user could also be presented by the device with the possible target candidates in a view that has each candidate control relatively spaced out more than they were in the original view (e.g. but still be presented at the same size), thus making the controls easier to distinguish and select using eye tracking.

Furthermore, a confidence level(s) of the device in properly interpreting eye input may be learned and/or adjusted by the device as time goes on and the user makes selections of controls using eye input using data such as the number of times a user makes corrections to the device's eye tracking interpretations of eye input. Data such as the difference in display distance between the identified display location to which eye input has been directed compared to the display location at which a control desired to be, and which ultimately is, selected may also be used. Thus, e.g., when the user corrects a selection interpreted by the device, the confidence level of that selection could be factored in for future decisions on whether to show an enlarged view or instead undertake a function associated with selection of the control with relatively high confidence (e.g. based on a confidence threshold indicated by a user and/or provider of the eye tracking software) without presenting the enlarged view.

After entering such an enlarged view, in some example embodiments if the user does nothing (e.g. provides no additional input), a highlighted control may be selected after a brief preset time period. Furthermore, an option to cancel making a selection may also be displayed on the enlarged view if none of the controls shown were the one intended to be selected by the user. Notwithstanding, note that when the enlarged view is presented, the user may select one of the enlarged options via eye tracking or other inputs methods such as those disclosed herein (e.g. touch input directed to the display).

Even further, in some embodiments when the enlarged view is presented, if eye tracking mechanisms and/or software have sufficient confidence of what the user is intending to select, the selection may proceed immediately after the desired confidence level is reached. In addition to or in lieu of the foregoing, selecting a desired control (e.g. from the regular and/or enlarged views) may in some embodiments call for an additional action (e.g. in addition to looking at the control) that is predefined and/or recognizable by the device (e.g. using data from a camera in accordance with present principles), such as blinking (e.g. a predetermined number of blinks within a predetermined threshold time period), a head nod, the user moving their eyes to an accept selection control (e.g. an OK button) and staring at it, squinting, moving their eyes offscreen, moving their eyes away from any of the selections, moving their head (e.g. nodding) while keeping eyes directed to the selection, and/or looking to the right after looking at a certain selection (or other direction as pre-configured by the user).

Also in some embodiments, canceling and/or removing the enlarged view may be done by (e.g. relatively quickly) looking in a certain direction with the user's eyes and/or head (such as looking left, which may be similar to a back button and/or back command, and/or shaking the user's head to mimic a "no" expression). Notwithstanding, it is to be understood that any of the user actions in the preceding paragraph may be employed by the user to "go back" to regular view from the enlarged view, and vice versa.

It may also be appreciated based on the present application that in some embodiments, once in the enlarged view, if the eye tracking mechanism(s) of the device still do not have sufficient confidence of what the user intends to select, one or more of the following may occur: the enlarged view may be further enlarged, and/or the controls shown in the enlarged view may be separated further from one another. Note that these options (e.g. further enlarging a view) may occur progressively and slowly until the desired confidence level is reached by the device (e.g. more than two progressively larger views may be presented). Still further, note that in an enlarged view, if the user temporarily looks away from the device (or left the proximity of device and/or put the device down), the amount of time the device waits for eye input may be extended.

While particular embodiments of the present application have been shown and described, it will be obvious to those skilled in the art that, based upon the teachings herein, that changes and modifications may be made without departing from this application and its broader aspects. Therefore, the appended claims are to encompass within their scope all such changes and modifications as are within the true spirit and scope of this application. Furthermore, it is to be understood that the application is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to e.g. devices and software containing only one such element, even when the same claim includes the introductory phrases "one or more" or "at least one" and indefinite articles such as "a" or "an"; the same holds true for the use in the claims of definite articles.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave and/or a signal per se.

While the particular MAGNIFICATION BASED ON EYE INPUT is herein shown and described in detail, it is to be understood that the subject matter which is encompassed by the present application is limited only by the claims.

What is claimed is:
1. A device, comprising:
at least one processor;
a display accessible to the at least one processor; and
storage accessible to the at least one processor and bearing instructions executable by the processor to:
detect first eye input to a first location on a user interface (UI) presented on the display;
in response to detecting the first eye input, identify at least two selector elements as at least being presented on the display proximate to the first location;
in response to identification of the at least two selector elements as at least being presented on the display proximate to the first location, execute respective functions associated with the at least two selector elements, and present a magnification interface on the UI, the magnification interface comprising a larger rendition of the at least two selector elements relative to presenta- tion of the at least two selector elements on the UI prior to the detection of the first eye input;
in response to selection, from the magnification interface, of a first selector element of the at least two selector elements, cease execution of the respective function associated with a second selector element of the at least two selector elements, wherein the first selector element is different than the second selector element.

2. The device of claim 1, wherein the instructions are executable to:
detect, for a threshold time, second eye input to the first selector element of the at least two selector elements presented on the magnification interface; and
in response to detection of the second eye input for the threshold time, undertake an action associated with selection of the first selector element.

3. The device of claim 1, wherein the instructions are executable to:
detect second eye input to a second location on the UI at which the magnification interface is not presented; and
in response to detection of the second eye input, remove the magnification interface from the UI.

4. The device of claim 3, where the instructions are executable to:
in response to detection of the second eye input for a threshold amount of time, remove the magnification interface from the UI.

5. The device of claim 1, wherein the instructions are executable to:
detect second eye input directed away from the display; and
in response to detection of the second eye input, remove the magnification interface from the UI.

6. The device of claim 1, where the instructions are executable to:
detect second eye input to the first selector element of the at least two selector elements presented on the magnification interface;
detect third input to a third selector element other than the first and second selector elements presented on the magnification interface; and
in response to detection of the third input, undertake an action associated with selection of the first selector element.

7. The device of claim 6, wherein the third selector element is presented on the magnification interface, and wherein the third input is eye input.

8. The device of claim 1, wherein the instructions are executable to:
based on the first eye input and prior to presentation of the magnification interface on the UI, identify a user as looking at the first selector element of the at least two selector elements; and
present the magnification interface on the UI with the first selector element highlighted on the magnification UI relative to the second selector element, the second selector element not being highlighted.

9. The device of claim 8, wherein the instructions are executable to:
in response to expiration of a threshold time in which no input has been received subsequent to presentation of the magnification interface, undertake an action associated with selection of the first selector element.

10. The device of claim 1, wherein the instructions are executable to:
detect second eye input of a user looking left relative to the user looking in the general direction of a camera which gathers the first eye input; and
in response to detection of the second eye input, remove the magnification interface from the UI.

11. The device of claim 1, wherein the larger rendition is a first larger rendition, and wherein the instructions are executable to:
detect second eye input to a second location on the magnification interface;
identify the first and second selector elements as at least being presented on the magnification interface proximate to the second location; and
present a second larger rendition of the first and second selector elements that were identified as being presented on the magnification interface proximate to the second location, wherein the second larger rendition comprises the first and second selector elements being respectively presented larger in at least one dimension than respectively presented in the first larger rendition.

12. The device of claim 1, wherein the magnification interface is presented with the larger rendition of the first and second selector elements being spaced apart proportionally more on the magnification interface relative to each other than the first and second selector elements were spaced apart prior to detection of the first eye input.

13. A method, comprising:
presenting a first selector element and a second selector element on a display, wherein the first selector element is different from the second selector element;
detecting first eye input to a first location on the display at least proximate to the first and second selector elements;
in response to the detecting of the first eye input, identifying at least one of the first and second selector elements as at least potentially being looked at;
in response to the identifying of the at least one of the first and second selector elements as at least potentially being looked at, presenting the first and second selector elements different than they were presented prior to receipt of the first eye input;
in response to the identifying of the at least one of the first and second selector elements as at least potentially being looked at, executing respective functions associated with the first and second selector elements; and
in response to selection, from the different presentation, of the first selector element, ceasing execution of the respective function associated with the second selector element.

14. The method of claim 13, wherein the first and second selector elements are presented different in response to the identifying of the at least one of the first and second selector elements as at least potentially being looked at by presenting the first and second selector elements spaced farther apart than they were spaced prior to detecting the first eye input.

15. The method of claim 13, wherein the first and second selector elements are presented different in response to the identifying of the at least one of the first and second selector elements as at least potentially being looked at by presenting the first and second selector elements larger in at least one dimension.

16. The method of claim 13, wherein the first and second selector elements are presented different in response to the identifying of the at least one of the first and second selector elements as at least potentially being looked at by presenting the first and second selector elements spaced farther apart than they were spaced prior to detecting the first eye input and by presenting the first and second selector elements larger in at least one dimension.

17. The method of claim 13, wherein the first and second selector elements are presented different in response to the identifying of the at least one of the first and second selector elements as at least potentially being looked at by presenting the first and second selector elements on a user interface (UI) overlaid on an area on which at least a portion of at least one of the first and second selector elements were presented prior to detecting the first eye input.

18. The method of claim 13, comprising:
detecting second eye input directed away from the different presentation; and
in response to the detecting of the second eye input away from the different presentation, no longer presenting the first and second selector elements in the different presentation.

19. An apparatus, comprising:
a first processor;
a network adapter;
storage bearing instructions executable by a second processor of a device for:
using data from at least one camera, detecting first eye input to a first location on a user interface (UI) presented on a display;
in response to detecting the first eye input, identifying first and second elements as at least being presented on the display proximate to the first location, wherein the first element is different from the second element;
without further user input, zooming in on the first and second elements;
in response to the identifying of the first and second elements as at least being presented on the display proximate to the first location, executing respective functions associated with the first and second elements; and
in response to selection of the first element as zoomed in on, ceasing execution of the respective function associated with the second element;
wherein the first processor transfers the instructions to the device over a network via the network adapter.

20. The apparatus of claim 19, wherein the UI is a first UI and wherein the zooming in on the first and second elements comprises one of the group consisting of: enlarging presentation of the first and second elements on the first UI, and presenting the first and second elements on a second UI overlaid on the first UI with the first and second elements each presented bigger in at least one dimension on the second UI than the first and second elements were presented prior to presentation of the second UI.

* * * * *